US008495927B2

(12) United States Patent
Namoun et al.

(10) Patent No.: US 8,495,927 B2
(45) Date of Patent: Jul. 30, 2013

(54) HEXAPOD PLATFORM AND JACK THAT CAN BE USED IN THE HEXAPOD PLATFORM

(75) Inventors: Fayçal Namoun, Courbevoie (FR); Ramzi Sellaouti, Clichy la Garenne (FR); Fathi Ben Ouezdou, Bourg la Reine (FR)

(73) Assignee: BIA, Conflans Ste Honorine (FR)

( * ) Notice: Subject to any disclaimer, the term of this patent is extended or adjusted under 35 U.S.C. 154(b) by 194 days.

(21) Appl. No.: 13/082,263

(22) Filed: Apr. 7, 2011

(65) Prior Publication Data

US 2011/0247446 A1 Oct. 13, 2011

(30) Foreign Application Priority Data

Apr. 8, 2010 (FR) ..................................... 10 52655

(51) Int. Cl.
*B25J 17/00* (2006.01)

(52) U.S. Cl.
USPC .................. 74/490.06; 74/490.03; 74/490.05; 901/15; 901/19; 901/22

(58) Field of Classification Search
USPC .. 74/490.01, 490.03, 490.05, 490.06; 901/15, 901/19, 22
See application file for complete search history.

(56) References Cited

U.S. PATENT DOCUMENTS

| | | | | |
|---|---|---|---|---|
| 4,410,049 | A * | 10/1983 | Molin | 173/2 |
| 4,565,487 | A * | 1/1986 | Kroczynski | 414/730 |
| 4,801,239 | A * | 1/1989 | Austad | 414/680 |
| 4,811,608 | A * | 3/1989 | Hilton | 73/862.043 |
| 5,116,190 | A * | 5/1992 | Silke | 414/735 |
| 5,350,054 | A | 9/1994 | Foster | |
| 5,847,528 | A * | 12/1998 | Hui et al. | 318/568.1 |
| 6,026,703 | A * | 2/2000 | Stanisic et al. | 74/490.06 |
| 6,271,828 | B1 * | 8/2001 | Rosenberg et al. | 345/156 |
| 6,516,681 | B1 * | 2/2003 | Pierrot et al. | 74/490.01 |
| 6,640,458 | B2 * | 11/2003 | Sawdon | 33/502 |
| 6,741,912 | B2 * | 5/2004 | Olesen et al. | 700/248 |

FOREIGN PATENT DOCUMENTS

| | | |
|---|---|---|
| DE | 77 00 917 U1 | 5/1978 |
| DE | 41 17 538 C1 | 7/1992 |
| DE | 196 08 132 A1 | 5/1997 |

* cited by examiner

*Primary Examiner* — David M Fenstermacher
(74) *Attorney, Agent, or Firm* — Baker & Hostetler LLP

(57) ABSTRACT

A hexapod platform and a jack that can be used in the hexapod platform are provided. The jack includes a body, a piston capable of translational movement with respect to the body and a rod connected to the piston to follow its translational movement and by means of which the jack applies load. The rod is connected to the piston by means of a ball joint. The hexapod platform comprises six jacks according to the invention.

9 Claims, 4 Drawing Sheets

HEXAPOD PLATFORM AND JACK THAT CAN BE USED IN THE HEXAPOD PLATFORM

CROSS-REFERENCE TO RELATED APPLICATION

This application claims priority to foreign French patent application No. FR 1052655, filed on Apr. 8, 2010, the disclosure of which is incorporated by reference in its entirety.

FIELD OF THE INVENTION

The invention relates to a hexapod platform and to a jack that can be used in the hexapod platform.

BACKGROUND

Hexapod platforms, which are also known as Gough-Stewart platforms, are used for precisely positioning objects in space. They comprise a fixed base and a top plate that can move with respect to the base. The top plate can move with six degrees of freedom with respect to the base to which is fixed an object the position and orientation configuration of which is to be controlled. This type of platform has numerous applications. Such platforms are, for example, found in the positioning of mechanical workpieces intended to be machined, for the positioning of parabolic antennas or telescopes, for flight simulators, or alternatively, for carrying out tests on how equipment behaves.

A hexapod platform generally comprises six legs of adjustable length connecting the moving top plate to the base. The legs are connected in pairs to the moving top plate and to the base. The pairs alternate so that the two legs of one and the same pair associated with the moving top plate belong to two different pairs associated with the base. In known hexapod platforms, each leg comprises a linear jack articulated at each of its ends to the base and to the moving top plate by means of a ball joint with three degrees of freedom in rotation. Coordinated adjustment of the length of each the six legs allows the moving top plate to be moved with six degrees of freedom.

During movements of the moving top plate, the jacks are all caused to rotate about the ball joints that connect them to the base. The jacks may be hydraulic or electric jacks. They are generally somewhat heavyweight and carry their own on-board drive system. The moving of the jacks accounts for a significant proportion of the overall inertia of the platform. This inertia is to the detriment of very fast movements of this platform.

SUMMARY OF THE INVENTION

The invention reduces the inertia of a hexapod platform to make it easier for the moving top plate to effect very fast and large scale movements.

In one aspect, the present invention provides a jack that can be used in a hexapod platform, the jack comprising a body, a piston capable of translational movement with respect to the body, and a rod connected to the piston to follow its translational movement and by means of which the jack applies load, characterized in that the rod is connected to the piston by means of a ball joint.

In another aspect, a hexapod platform comprises six jacks according to the invention, the platform comprising a base and a moving top plate, characterized in that the six jacks are fixed to the base by their body and are connected to the moving top plate via their second ball joint.

BRIEF DESCRIPTION OF THE DRAWINGS

The invention will be better understood and other advantages will become apparent from reading the detailed description of one embodiment, given by way of example, which description is illustrated by the attached drawings, in which.

For clarity, in the various figures, the same elements will bear the same references.

DETAILED DESCRIPTION

Figure 1:
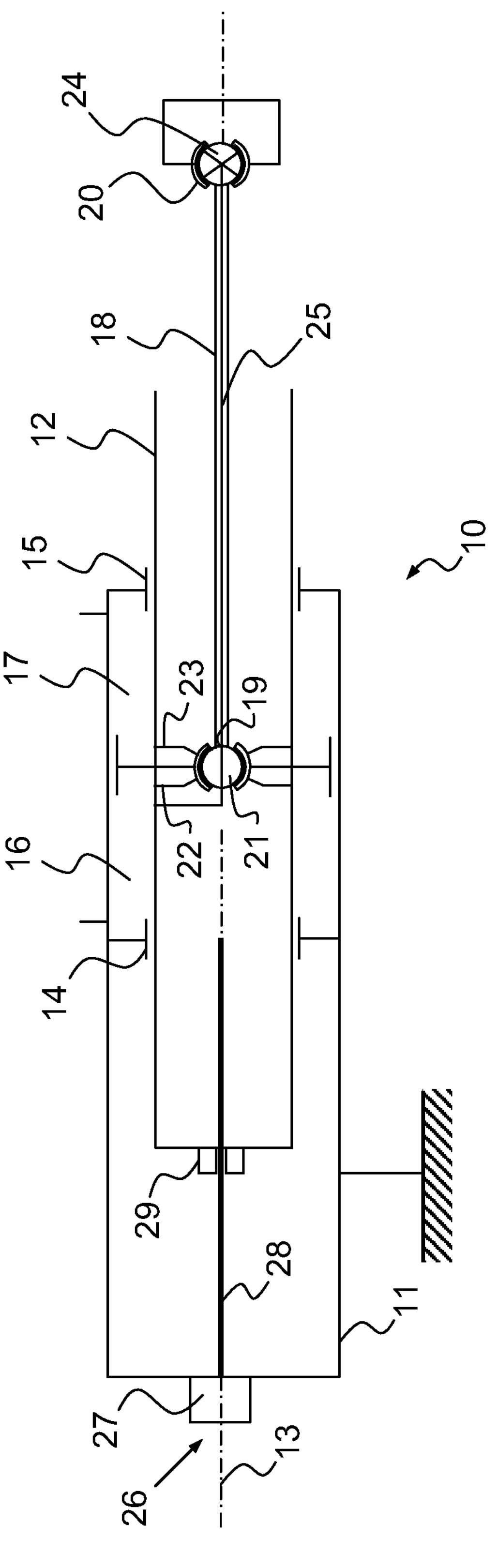
FIG. 1 schematically depicts a jack according to the invention.

FIG. 1 depicts a linear jack 10 comprising a body 11 and a piston 12 capable of translational movement with respect to the body 11 along a longitudinal axis 13. The piston 12 is guided in its translational movement by means of two bearings 14 and 15 belonging to the body 11. In the example depicted, the jack is a hydraulic jack, but of course the invention can be implemented with other ways of driving the jack, such as in the case of an electrical or pneumatic jack for example. The jack 10 is a double-acting jack and comprises two chambers 16 and 17 produced in the body 11 and separated by the piston 12. The two chambers 16 and 17 are fed with a pressurized hydraulic fluid. A difference in the pressure of the hydraulic fluid between the two chambers 16 and 17 allows the piston to be caused to effect a translational movement along the axis 13. It is also possible to employ the invention with a single-acting jack in which just one chamber is supplied with hydraulic fluid. The other chamber may be replaced by a spring that allows the piston 12 to be returned to a position that is obtained when the pressure of the hydraulic fluid is zero.

The jack 10 comprises a rod 18 via which the jack applies load. More specifically, the rod 18 comprises two ends 19 and 20. The end 19 is connected to the piston 12 and the end 20 bears against an external element to which the load produced by the jack 10 is applied. In a jack of the prior art, the rod 18 is secured to the piston 12 at the end 19. According to the invention, the rod 18 is connected to the piston by means of a ball joint 21 situated at the end 19. This joint allows the rod 18 angular movement with respect to the axis 13.

By using a hydraulic jack, the ball joint 21 can advantageously be hydrostatic and is supplied with fluid by tapping off some of the fluid used to operate the jack 10. The tapping off may be done via one or more channels 22 and 23 each of them connecting chambers 16 and 17 and the ball joint 21. As a result of this, the pressure of the fluid in the ball joint 21 is dependent on the pressure of the fluid in the chambers 16 and 17. Thus, the more heavily loaded the jack, the greater the pressure in at least one of the chambers 16 or 17 and the greater the hydrostatic film created in the ball joint 21.

The jack 10 may comprise a second ball joint 24 situated at the second end 20 of the rod 18. This second ball joint 24 allows an object to be connected to the jack 10. The load applied by the jack 10 passes through the first ball joint 21, the rod 18 and the second ball joint 24. Advantageously, the second ball joint 24 is likewise hydrostatic and is supplied with fluid by tapping off some of the fluid used to operate the jack 10. The tapping off may be done by a channel 25 situated inside the rod 18 and connecting the two ball joints 21 and 24.

The jack may comprise a sensor 26 that senses the position of the piston 12 with respect to the body 11 in its translational movement along the axis 13. The sensor 26 is, for example, of the magnetostrictive type. It comprises a housing 27 secured to the body 11 and capable of emitting an ultrasound wave along a ferromagnetic bar 28. A magnet 29 secured to the piston 12 slides along the bar 29 as the piston 12 moves and alters the ultrasound wave. Measuring, inside the housing 27, this wave allows the position of the piston 12 to be determined.

Figure 2:
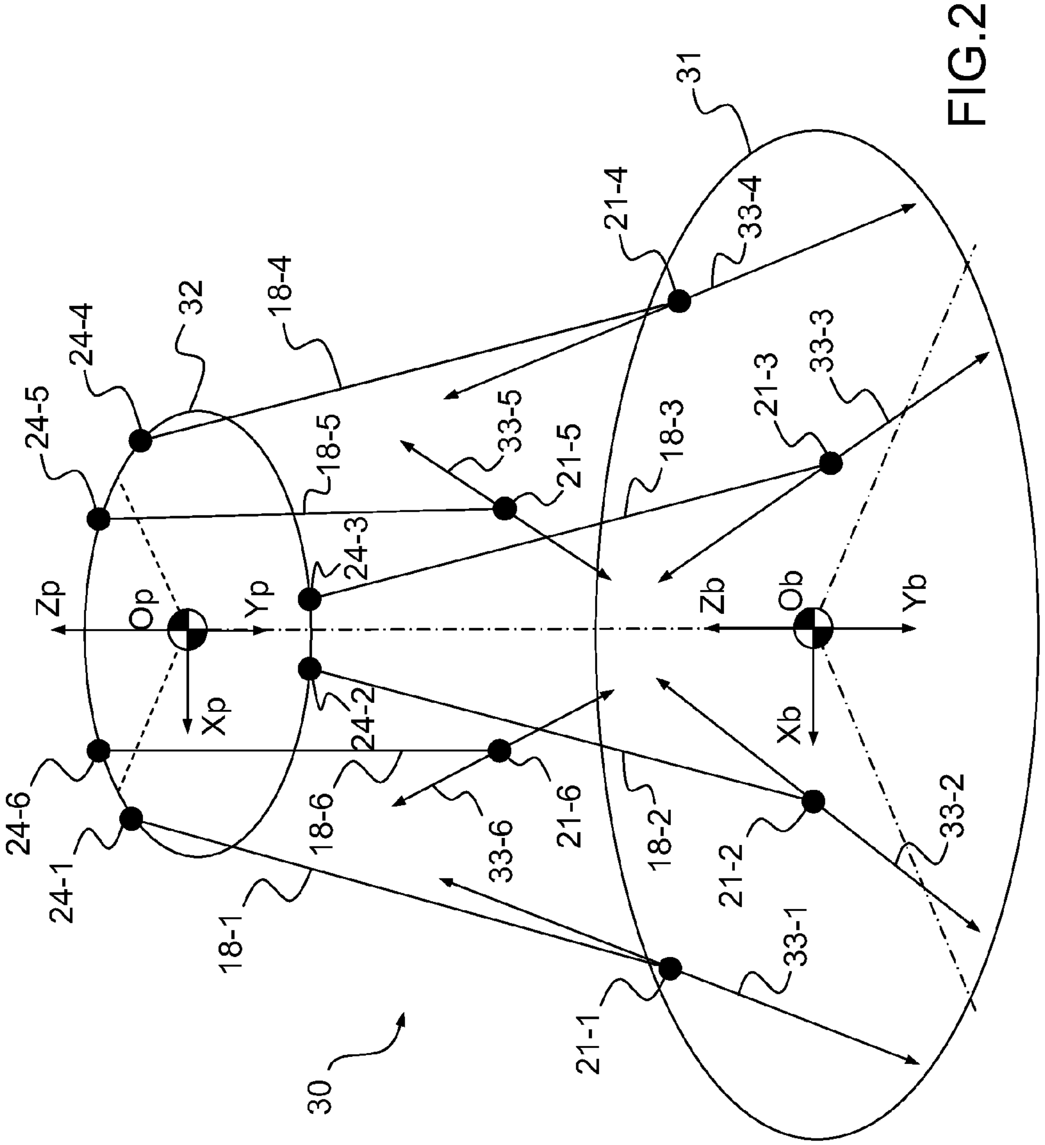
FIG. 2 depicts a kinematic diagram of a hexapod platform according to the invention.

FIG. 2 depicts a kinematic diagram of a hexapod platform 30 comprising a base 31, a moving top plate 32 and six jacks 10 like those described in relation to FIG. 1. The body 11 of each of the jacks 10 is fixed to the base 31 and the directions of the translational movements of the pistons 12 are represented by six double-headed arrows 33-1 to 33-6. Because the bodies 11 are fixed to the base 31, the directions 33-1 to 33-6 are fixed in space in a frame of reference connected with the base 31. The six rods 18 and their ball joints 21 and 24 bear suffixed references that correspond to the directions: 18-1 to 18-6 for the rods, 21-1 to 21-6 for the first ball joints and 24-1 to 24-6 for the second ball joints.

Figure 3:
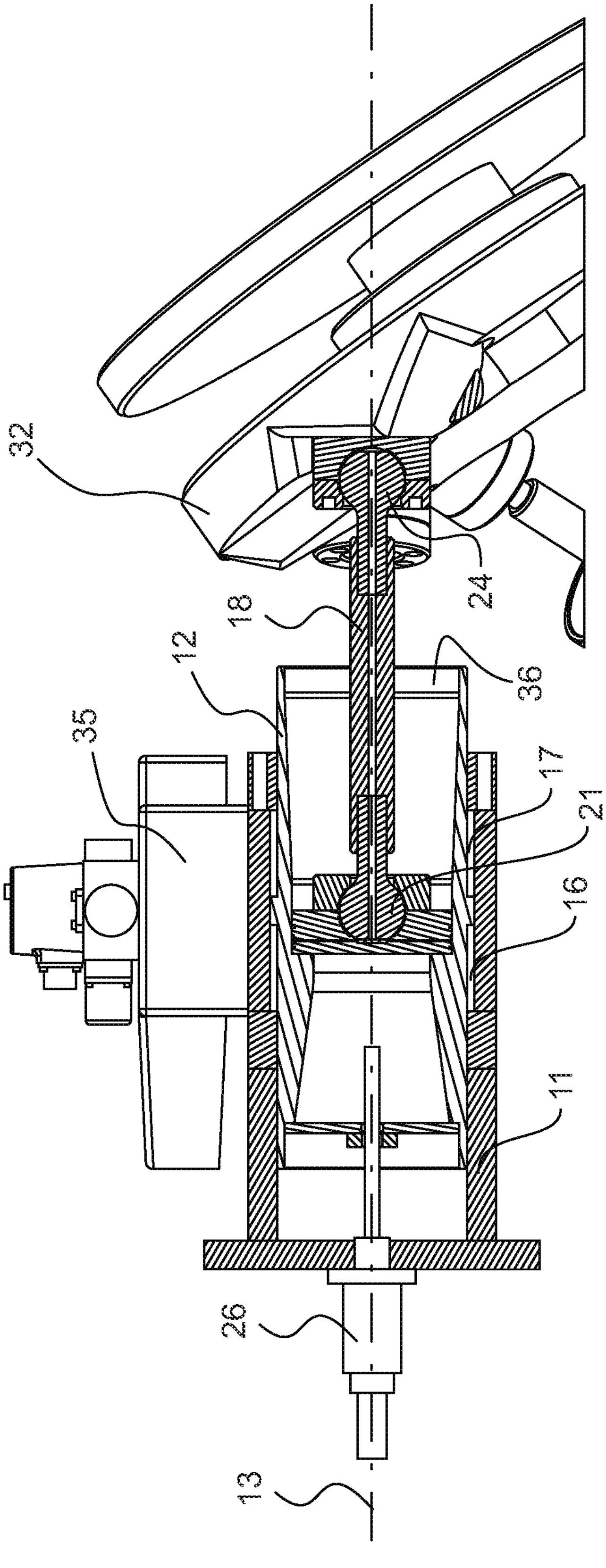
FIG. 3 depicts one exemplary embodiment of a jack as schematically illustrated in FIG. 1.

FIG. 3 depicts one exemplary embodiment of a jack 10. This figure again shows the piston 12 which is capable of a translational movement along the axis 13 in the body 11, the rod 18, the ends of which bear the ball joints 21 and 24, and part of the moving top plate 32. FIG. 3 shows a hydraulic control member 35 for controlling the jack 10. The member 35 comprises for example a servo valve allowing the two chambers 16 and 17 to be supplied with fluid.

In the prior art in which the body of the jack is capable of moving during movements of the moving top plate, it is preferable for such a control member to be fixed to the base rather than to the body of the jack. This is so as to limit the inertia of the body with the jack. Because of the possibility of relative movement of the control member with respect to the body of the jack, flexible hoses have to be used to supply the chambers of the jack with hydraulic fluid from the control member. Fixing the body 11 of the jack 10 to the base 31 means that rigid piping can be fitted between the member 35 and the body 11.

Advantageously, the hydraulic control member 35 of the jack 10 is fixed to the body 11. Because the body 11 is fixed with respect to the base 31, no additional inertia is generated by the member 35. This fixing to the body 11 makes it possible to reduce the length of the piping that connects the member 35 and the body 11. This makes it possible to reduce pressure drops in this piping. This advantage becomes important when the movements of the moving top plate 32 need to be rapid, causing the hydraulic fluid to have to move quickly between the member 35 and the chambers 16 and 17.

The piston 12 is of tubular shape and comprises an opening 36 through which the rod 18 can pass. The opening 36 is, for example, circular about the axis 13 and its diameter has to be large enough to allow the rod 18 some angular excursion about the axis 13 which excursion is compatible with the maximum range of the moving top plate 32.

Figure 4:
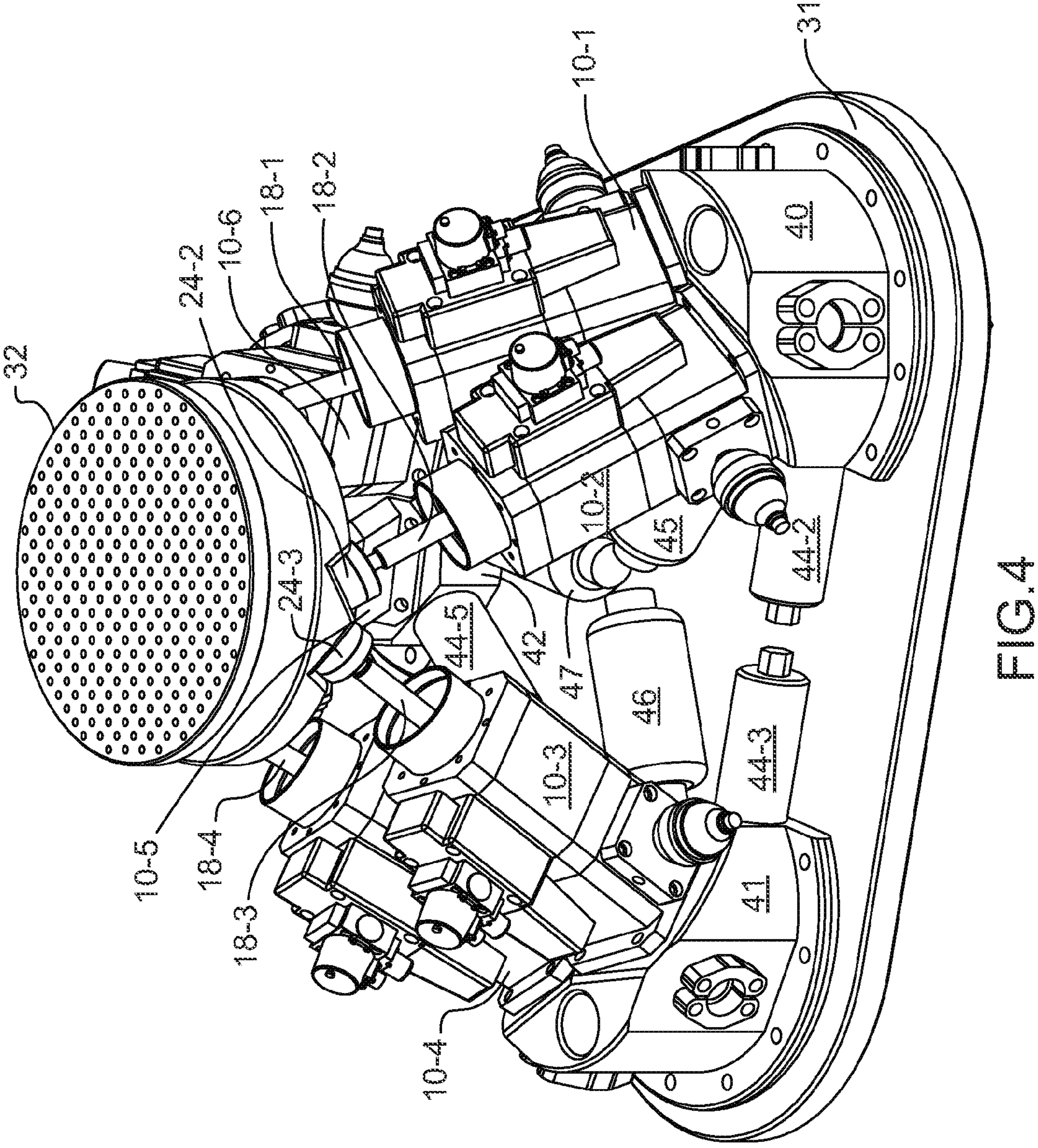
FIG. 4 depicts one exemplary embodiment of a hexapod platform as schematically illustrated in FIG. 2.

FIG. 4 is a perspective depiction of one exemplary embodiment to a hexapod platform 30 like the one schematically illustrated in FIG. 2. The six jacks bear the references 10-1 to 10-6. They are all identical to the jack 10 described hereinabove. The bodies 11 of the various jacks are fixed to the base 31 in pairs by mounts. More specifically, the jacks 10-1 and 10-2 are fixed to a mount 40, the jacks 10-3 and 10-4 are fixed to a mount 41, and the jacks 10-5 and 10-6 are fixed to a mount 42. The rods 18-1 to 18-6 are connected to the moving top plate 32 via ball joints 24-1 to 24-6. These ball joints are grouped together in pairs. The pairs of ball joints 24-1 to 24-6 alternate with respect to the pairs of jacks grouped together mount by mount. More specifically, the ball joints 24-2 and 24-3 form a first pair, the balls 24-4 and 24-5 form a second pair, and the ball joints 24-6 and 24-1 form a third pair.

The hexapod platform 30 comprises reservoirs that act as accumulators of hydraulic fluid. These reservoirs contain hydraulic fluid either at high pressure or at low pressure. The control member 35 associated with each jack 10-1 to 10-6 allows the chambers of each jack 10-1 to 10-6 to be connected either to the high-pressure fluid or to the low-pressure fluid. All these reservoirs are fixed with respect to the base 31 and are therefore fixed with respect to the body 11 of each of the jacks 10-1 to 10-6. The hexapod platform 30 for example comprises a low-pressure reservoir 44-1 to 44-6 associated with each respective jack 10-1 to 10-6 and a high-pressure reservoir 45, 46 and 47 which is common to two jacks. More specifically, one high-pressure reservoir 45 is associated with the jacks 10-1 and 10-2, one high-pressure reservoir 46 is associated with the jacks 10-3 and 10-4, and one high-pressure reservoir 47 is associated with the jacks 10-5 and 10-6. The high-pressure and low-pressure reservoirs may be associated with the jacks 10-1 to 10-6 via the mounts 40 to 42 to which the reservoirs are fixed. Rigid piping connects the reservoirs to the control members 35 of each jack 10-1 to 10-6. A central hydraulic unit may supply pressurized hydraulic fluid to the various reservoirs. This unit may be connected to the various mounts 40 to 42.

The invention claimed is:

1. A hexapod platform, comprising:
- a base;
- a moving top plate; and
- six jacks, each of the six jacks comprising
  - a body,
  - a piston configured for translational movement with respect to the body, and
  - a rod connected to the piston to follow the translational movement of the piston and by means of which each of the six jacks applies a load,
- wherein for each of the six jacks, the rod is connected to the piston by means of a first ball joint disposed at a first end of the rod, each of the six jacks comprising a second ball joint disposed at a second end of the rod, and
- wherein the body of each of the six jacks is fixed to the base, and the second ball joint of each of the six jacks is connected to the moving top plate.

2. The platform according to claim 1, wherein the six jacks are hydraulic jacks and wherein, for each of the six jacks the first ball joint is hydrostatic and is supplied with fluid by tapping off a fluid used to operate the jack.

3. The platform according to claim 2, wherein for each of the six jacks the second ball joint is hydrostatic and is supplied with fluid by tapping off fluid used to operate the jack.

4. The platform according to claim 3, wherein for each of the six jacks the supply of fluid to the second ball joint is conveyed by means of a channel located in the rod and connecting the first ball joint with the second ball joint.

5. The platform according to claim 2, wherein each of the six jacks further comprises two chambers defined by the body and separated by the piston, and wherein for each of the six jacks, fluid is tapped off via one or more channels connecting each of the chambers and the first ball joint.

6. The platform according to claim 1, wherein each of the six jacks further comprises a hydraulic control member for controlling a corresponding one of the six jacks, the hydraulic control member being fixed to the body of the corresponding one of the six jacks.

7. The platform according to claim 1, further comprising mounts fixed to the base and to which the bodies of the six jacks are fixed in pairs, and hydraulic-fluid-accumulating reservoirs associated with the six jacks and fixed to the mounts.

8. The platform according to claim 1, further comprising a sensor that senses a position of the piston with respect to the body along an axis of the body.

9. The platform according to claim 8, wherein the sensor is a magnetostrictive sensor including:

a sensor housing secured to the body, a ferromagnetic bar extending from the sensor housing, and a magnet secured to the piston and configured to slide relative to the ferromagnetic bar.

* * * * *